United States Patent
Kaji et al.

Patent Number: 6,158,545
Date of Patent: Dec. 12, 2000

[54] POWER STEERING APPARATUS

[75] Inventors: Hiroaki Kaji, Yamatokooriyama; Yuji Kariatsumari, Kashiwara, both of Japan

[73] Assignee: Koyo Seiko Co., Ltd., Osaka, Japan

[21] Appl. No.: 09/431,188

[22] Filed: Nov. 1, 1999

[30] Foreign Application Priority Data

Nov. 10, 1998  [JP]  Japan .................................. 10-319528

[51] Int. Cl.⁷ ...................................................... B62D 5/99
[52] U.S. Cl. .............................................. 180/446; 701/41
[58] Field of Search ................................. 180/443, 446; 701/41

[56] References Cited

U.S. PATENT DOCUMENTS

| | | | |
|---|---|---|---|
| 4,771,843 | 9/1988 | Shimizu | 180/446 |
| 4,771,845 | 9/1988 | Shimizu | 180/446 |
| 4,789,040 | 12/1988 | Morishita et al. | 180/446 |
| 4,800,974 | 1/1989 | Wand et al. | 180/443 |
| 4,869,334 | 9/1989 | Marumoto et al. | 180/446 |
| 4,934,473 | 6/1990 | Fushimi et al. | 180/446 |
| 4,986,379 | 1/1991 | Morishita | 180/446 |
| 5,103,926 | 4/1992 | Ohno et al. | 180/446 |
| 5,623,409 | 4/1997 | Miller | 180/446 |

*Primary Examiner*—Eric Culbreth
*Assistant Examiner*—L. Lum
*Attorney, Agent, or Firm*—Rabin & Champagne, P.C.

[57] ABSTRACT

In a power steering apparatus according to the present invention, a threshold ITH of a motor electric current for actuation of an oil pump is set at a lower level when a working oil has a high viscosity resistance at a low oil temperature, so that the oil pump can be actuated at an earlier stage. Conversely, when the working oil has a low viscosity resistance at a high oil temperature, the threshold ITH of the motor electric current for the actuation of the oil pump is set at a higher level because there is no need to actuate the oil pump at the earlier stage. Thus, the electric motor can be actuated without any problem even at an extremely low temperature, so that an entrapped feeling can promptly be mitigated.

3 Claims, 8 Drawing Sheets

POWER STEERING APPARATUS

This application is based on Patent Application No. 10-319528 filed in Japan, the content of which is incorporated thereinto by reference.

TECHNICAL FIELD

The present invention relates to a power steering apparatus and, more particularly, to a so-called motor-driven hydraulic power steering apparatus which is adapted to generate a hydraulic pressure by driving an oil pump by an electric motor to assist a steering operation by the generated hydraulic pressure.

BACKGROUND ART

Motor-driven hydraulic power steering apparatuses are conventionally known which are adapted to rotate an oil pump by an electric motor and supply a working oil to a power cylinder from the oil pump to mitigate an operation force required for operating a steering wheel.

Where the ambient temperature is extremely low (e.g., −40 ° C.), the working oil has an extremely high viscosity resistance at actuation of the electric motor.

In such a case, when the electric motor is actuated for steering assist, the electric motor cannot properly be driven due to a higher back pressure. Even if the driving of the electric motor is possible, the rotation speed of the electric motor cannot be increased to greater than a certain level, so that a fail-safe function is effectuated for protection of an electric motor driver element to deactuate the power steering function.

To avoid the deactuation of the power steering function, it is preferred to measure the temperature of the electric motor driver element to make a fail-safe judgment on the basis of the temperature.

Even if the power steering function is not deactuated, it takes some time before the working oil can be supplied to the power cylinder at a required flow rate. With the steering operation being started in such a state, the steering assist cannot sufficiently be performed, so that a so-called entrapped feeling is aggravated. The entrapped feeling may be mitigated by reduction in the viscosity resistance when the oil pump is driven to raise the temperature of the working oil. However, it takes some time before the temperature of the working oil rises, if the oil pump is driven at a low rotation speed. This causes a driver to feel discomfort for a while.

DISCLOSURE OF THE INVENTION

It is an object of the present invention to provide a power steering apparatus which is capable of actuating an electric motor even at an extremely low temperature without any problem so that an entrapped feeling can quickly be mitigated.

It is another object of the present invention to provide a power steering apparatus which is capable of properly control a fail-safe function while protecting an electric motor driver element.

In accordance with one aspect of the present invention to achieve the aforesaid objects, there is provided a power steering apparatus which comprises: oil temperature detection means for sensing an oil temperature; electric current detection means for sensing an electric current flowing through an electric motor; storage means for storing therein a threshold of the motor electric current as a function of the oil temperature; judgment means for judging whether or not the motor electric current sensed by the electric current detection means is smaller than the threshold obtained from the storage means on the basis of the oil temperature sensed by the oil temperature detection means; and control means for driving the electric motor at a predetermined rotation speed or at a predetermined voltage if the judgment means judges that the motor electric current is not smaller than the threshold obtained from the storage means (claim 1).

In the power steering apparatus, the threshold of the motor electric current is stored as the function of the oil temperature and, if it is judged that the motor electric current is not smaller than the threshold based on the sensed oil temperature, the electric motor is driven at the predetermined rotation speed or at the predetermined voltage.

The aforesaid "predetermined rotation speed" or "predetermined voltage" is a rotation speed or a voltage required for quickly providing a steering assist force by increasing the oil temperature, and set at not lower than a rotation speed level or a voltage level which is employed for a normal assist control. The aforesaid "threshold based on the oil temperature" is set at a higher level for a higher oil temperature and set at a lower level for a lower oil temperature.

In accordance with the present invention, the electric motor is driven in accordance with the oil temperature, whether or not the steering operation is performed. Where the viscosity resistance of the working oil is high at a low oil temperature, for example, the oil pump should be driven at an earlier stage than in a case where the viscosity resistance of the working oil is low at a high oil temperature. Accordingly, the threshold of the motor electric current for actuation of the oil pump can be set at a lower level. Where the viscosity resistance of the working oil is low at a high oil temperature, conversely, there is no need to drive the oil pump as early as in the case where the viscosity resistance of the working oil is high at a low oil temperature. Accordingly, the threshold of the motor electric current for the actuation of the oil pump can be set at a higher level.

Therefore, the electric motor can be actuated even at an extremely low temperature without any problem, so that the entrapped feeling can promptly be mitigated. Thus, the power steering apparatus ensures an excellent steering performance.

Where the electric motor is driven at the predetermined rotation speed or at the predetermined voltage, the driving of the electric motor is sustained for a predetermined time period (claim 2).

The aforesaid "predetermined time period" is determined so that the steering assist force can promptly be provided by increasing the oil temperature when the electric motor is driven at the predetermined rotation speed or at the predetermined voltage.

In accordance with another aspect of the present invention, there is provided a power steering apparatus which comprises: driver element temperature detection means for sensing a temperature of an electric motor driver element; rotation speed detection means for sensing a rotation speed of an electric motor; judgment means for judging whether or not the rotation speed of the electric motor sensed by the rotation speed detection means is greater than a preliminarily stored threshold; and control means for deactuating a power steering function if the judgment means judges that the rotation speed of the electric motor is kept at not greater than the threshold for a predetermined reference time period, wherein the control means sets the reference time period in accordance with the temperature of the electric motor driver element sensed by the driver element temperature detection means so that the reference time period becomes shorter as the temperature becomes higher and becomes longer as the temperature becomes lower (claim 3).

In accordance with the present invention, when the electric motor is driven at the startup of the system, the rotation speed of the electric motor is sensed and, if the rotation speed is not greater than the threshold, a fail-safe function is effectuated. At this time, a greater electric current is permitted to flow through the driver element for a relatively long period if the temperature of the driver element is low. Therefore, the reference time period is set longer. If the temperature of the driver element is high, conversely, the reference time period is set shorter for prevention of breakdown of the driver element.

Thus, the fail-safe function as well as the protection of the electric motor driver element can properly be realized.

BRIEF DESCRIPTION OF THE DRAWINGS

FIG. 4 is a diagram illustrating electrical interconnection of an electronic control unit ECU and the like;

BEST MODE FOR IMPLEMENTATION OF THE INVENTION

Figure 1:
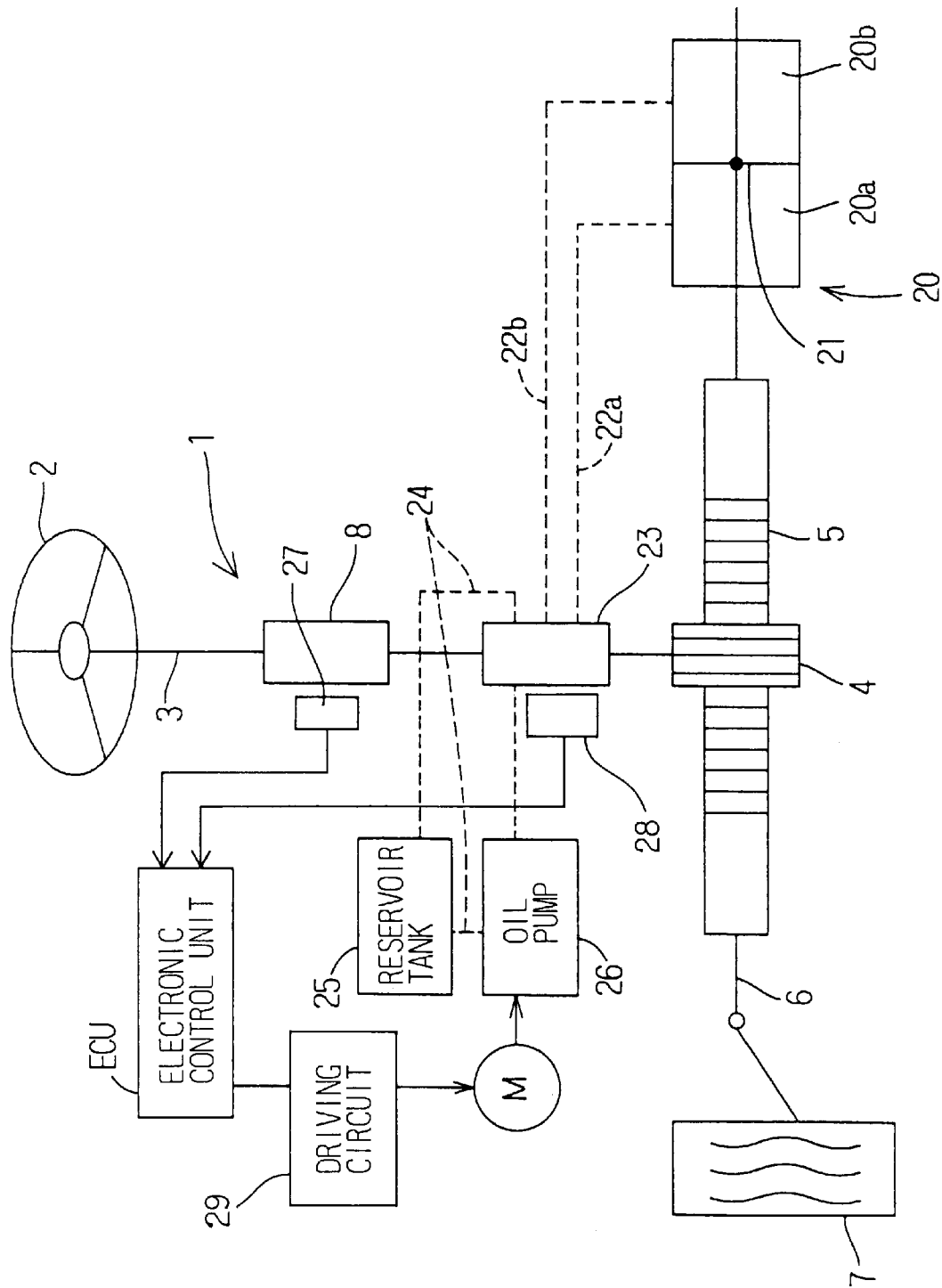
FIG. 1 is a schematic diagram illustrating the overall construction of a power steering apparatus according to one embodiment of the present invention.

FIG. 1 is a schematic diagram illustrating the overall construction of a power steering apparatus according to one embodiment of the present invention. The power steering apparatus is incorporated in a motor vehicle and adapted to assist a steering operation of a steering mechanism 1.

The steering mechanism 1 includes a steering wheel 2. A steering shaft 3 is coupled to the steering wheel 2, and a pinion gear 4 is attached to the distal end of the steering shaft 3. The pinion gear 4 is meshed with a rack gear 5 which extends transversely of the vehicle. Front tires 7 are attached to the rack gear 5 via tie rods 6.

When the steering wheel 2 is operated and a torque applied thereto is transmitted to the steering shaft 3, the pinion gear 4 provided at the distal end of the steering shaft is rotated, so that the rack gear 5 is moved transversely of the vehicle. As a result, the movement of the rack gear 5 is transmitted to the tie rods 6 to change the orientation of the front tires 7.

The power steering apparatus further includes a power cylinder 20 for generating a steering assist force. The power cylinder 20 includes a piston 21 coupled to the rack shaft 5, and a pair of cylinder chambers 20a, 20b split by the piston 21. A hydraulic pressure control valve 23 is connected to the cylinder chambers 20a, 20b via oil supply lines 22a, 22b indicated by broken lines.

The hydraulic pressure control valve 23 is interposed in an oil circulation line 24 indicated by a broken line. Through the oil circulation line 24, a working oil contained in a reservoir tank 25 is pumped up by an oil pump 26, then discharged from the oil pump 26, and returned into the reservoir tank 25.

The oil pump 26 is driven and controlled by an electric motor M. When the oil pump 26 is driven by the electric motor M, the working oil is circulated through the oil circulation line 24. With the oil pump being off, the circulation of the working oil is suspended.

A torque sensor 27 is provided in association with a torsion bar 8 attached to the steering shaft 3, and outputs a torque signal having a value proportional to the magnitude of a torque applied to the steering shaft 3 and a sign corresponding to the direction of the torque. A torque sensor of any type such as a potentiometer having a mechanical contact or a non-contact torque sensor may be employed as the torque sensor 27.

The hydraulic pressure control valve 23 is adapted to change its valve aperture in accordance with the direction and magnitude of the torque applied to the steering shaft 3 so that the supply of the working oil to the power cylinder 20 can be varied.

When the working oil is supplied to either of the cylinder chambers of the power cylinder 20, the piston 21 is moved in a corresponding direction transversely of the vehicle. Thus, a steering force is generated to assist the movement of the rack shaft 5. An oil temperature sensor 28 is attached to the oil circulation line 24 or the reservoir tank 25 for sensing the temperature of the working oil.

The electric motor is driven by a driving circuit 29. The driving circuit 29 is controlled by an electronic control unit ECU. The electronic control unit ECU includes a microprocessor having a CPU, a ROM and a RAM.

Figure 2:
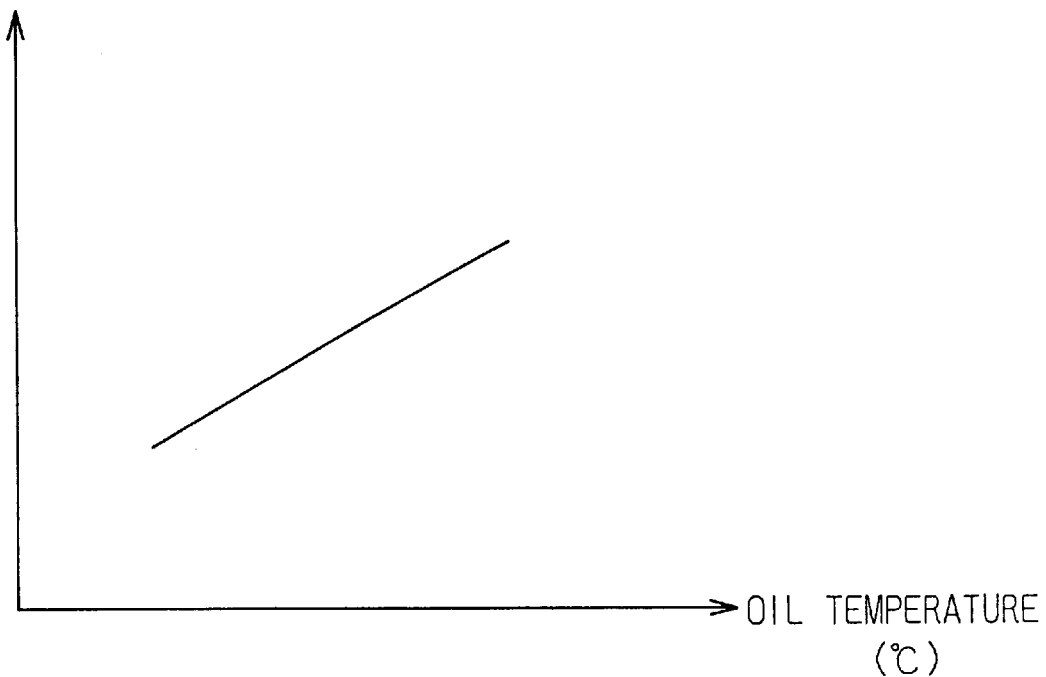
FIG. 2 is a graph showing a relationship between a threshold of a motor electric current and a working oil temperature.

A threshold of a motor electric current for high speed rotation of the electric motor M is stored as a function of an oil temperature in the ROM. FIG. 2 is a graph showing a relationship between the threshold of the motor electric current and the oil temperature. The threshold of the motor electric current decreases with a reduction in the working oil temperature as shown in FIG. 2. The working oil is supplied into the power cylinder 20 via the hydraulic pressure control valve 23 from the oil pump 26 driven by the electric motor M. As the temperature of the working oil becomes lower, the viscosity resistance of the working oil increases and, therefore, the oil pump 26 should be driven more quickly with a greater driving force. Accordingly, the threshold of the motor electric current for the high speed rotation of the electric motor M is set lower.

Figure 3:
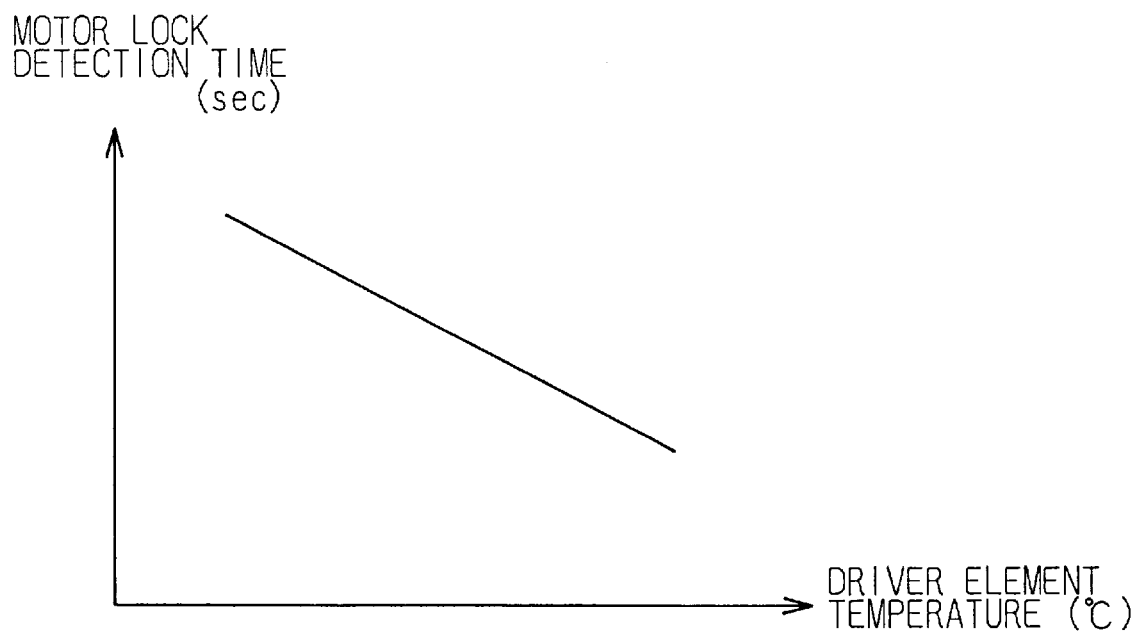
FIG. 3 is a graph showing a relationship between a driver element temperature and a motor lock detection period.

The ROM also stores therein a relationship between the temperature of a driver element in the driving circuit 29 and a motor lock detection period as shown in FIG. 3. The motor lock detection period is increased with a reduction in the temperature of the driver element as shown in FIG. 3. Where a fail-safe function is to be effectuated upon detection of electric motor lock, a great electric current is permitted to flow through the driver element for a relatively long period if the temperature of the driver element is low. Therefore, the motor lock detection period is set longer. If the temperature of the driver element is high, the motor lock detection period is set shorter because breakdown of the driver element is liable to occur.

Figure 4:
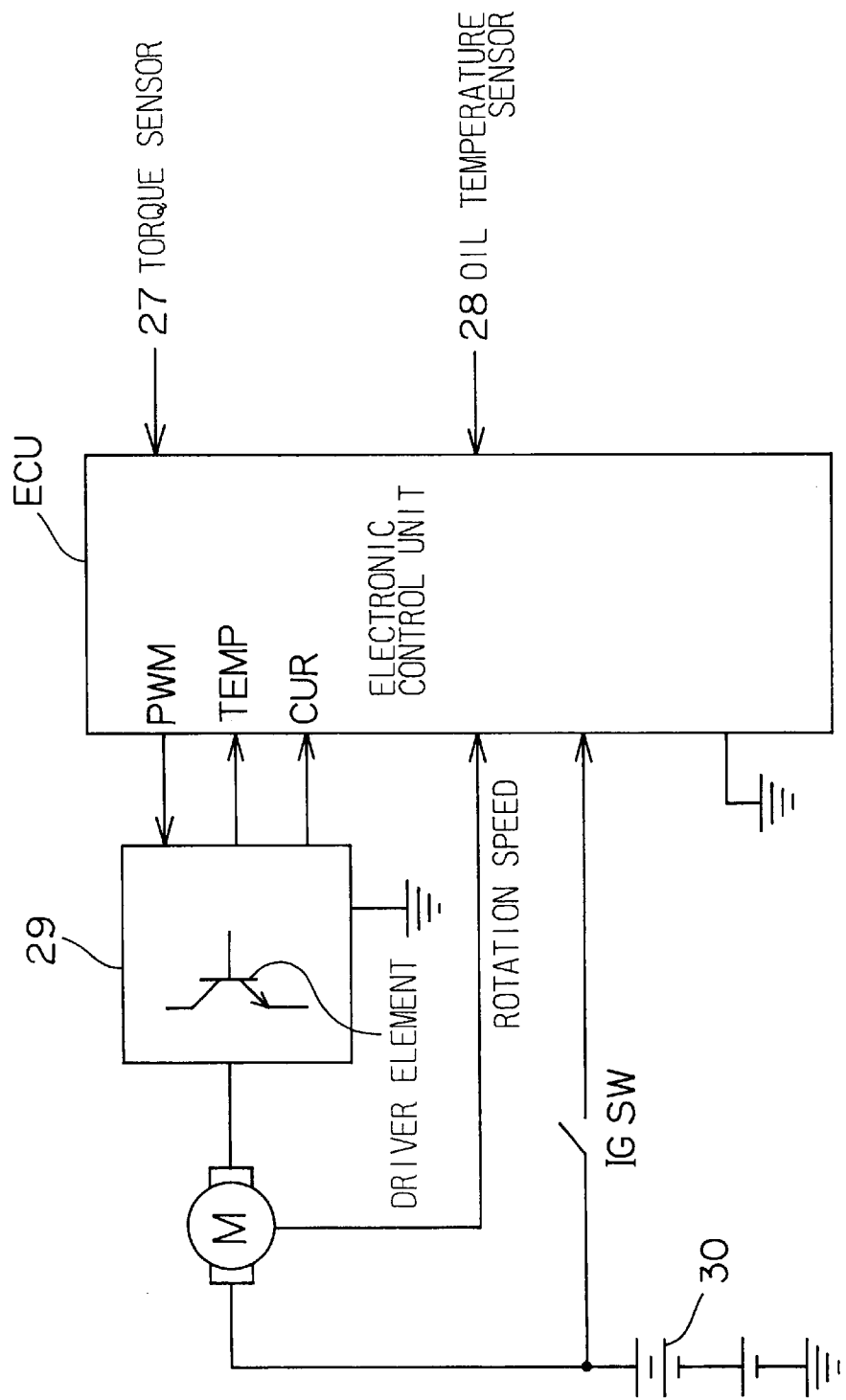

FIG. 4 is a diagram illustrating electrical interconnection of the electronic control unit ECU and the like. A torque signal and an oil temperature signal are applied to the electronic control unit ECU from the torque sensor 27 and the oil temperature sensor 28, respectively. A temperature detection signal of the driver element in the driving circuit 29 and a rotation speed signal of the electric motor M are also inputted to the electronic control unit ECU. The temperature of the driver element is sensed by a thermistor or the like incorporated in the driving circuit.

Power is supplied to the electric motor M from a battery 30 of the vehicle through the driving circuit 29. The driving circuit 29 generates a driving signal pulse-width-modulated at a duty ratio instructed by the electronic control unit ECU. The level of the electric current flowing through the electric motor from the driving circuit 29 is sensed and inputted to the electronic control unit ECU.

The electronic control unit ECU controls the driving circuit 29 on the basis of the torque signal applied from the torque sensor 27, the oil temperature signal applied from the oil temperature sensor 28, the driver element temperature signal and the rotation speed signal of the electric motor M.

Figure 5:
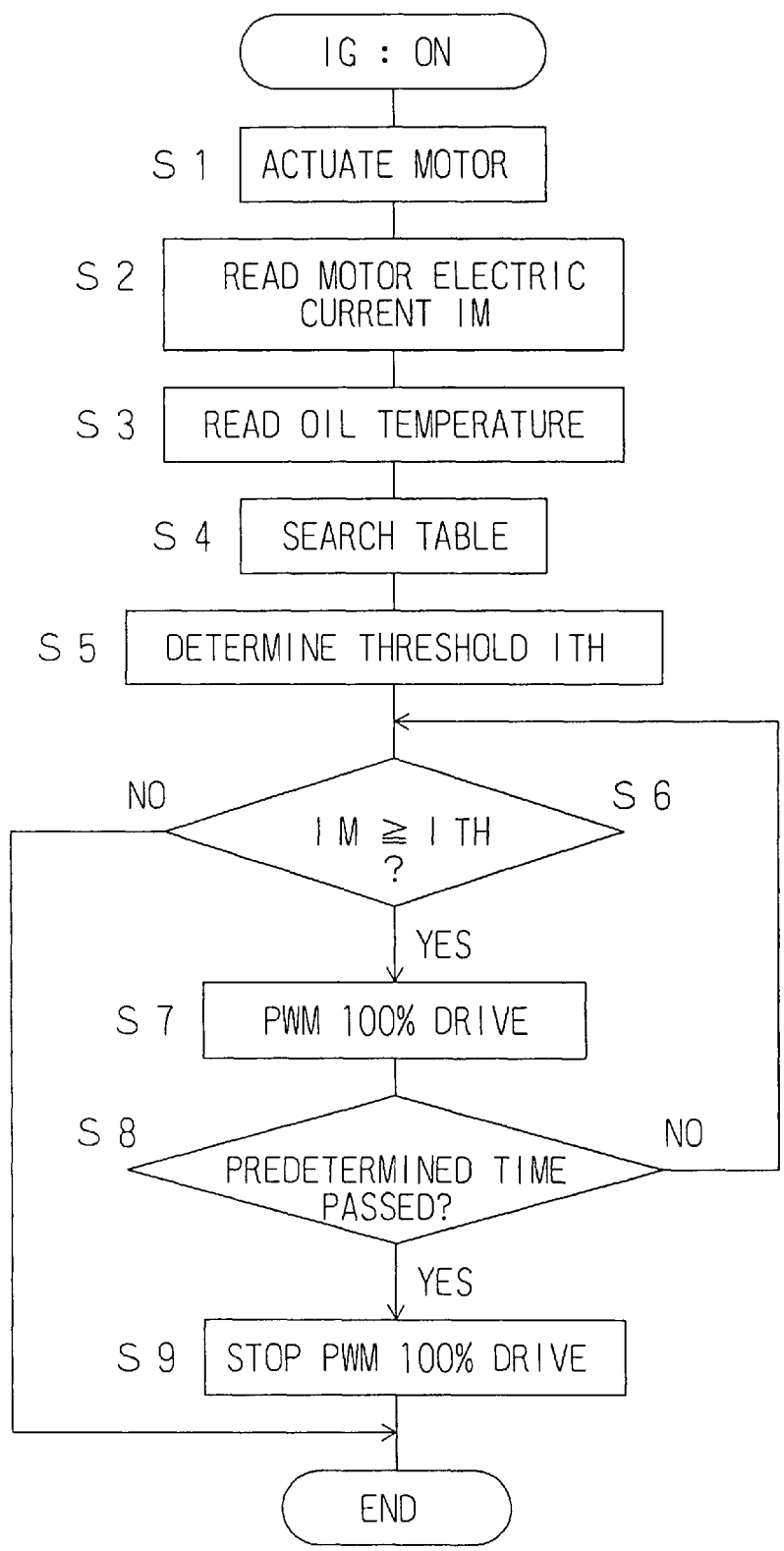
FIG. 5 is a flow chart for explaining a motor driving control process to be performed by the electronic control unit.

FIG. 5 is a flow chart for explaining a motor driving control process to be performed by the electronic control unit ECU at the actuation of the electric motor.

An ignition switch (IG) is turned on to actuate an engine and, in response thereto, the electronic control unit ECU starts driving the electric motor M at a predetermined duty ratio according to the magnitude of the steering torque (Step S1). As a result, the oil pump 26 is actuated, so that the working oil is circulated through the oil circulation line 24.

If the ambient temperature is not low at this time, the temperature of the working oil speedily rises, permitting the oil pump to operate without any trouble. If the ambient temperature is low, conversely, the temperature of the working oil does not speedily rise, so that the working oil still has a high viscosity resistance.

In this process, the electronic control unit ECU reads the electric current IM flowing through the electric motor (Step S2). Further, the electronic control unit ECU reads the oil temperature applied from the oil temperature sensor 28 (Step S3). Then, the table in the ROM (see FIG. 2) is searched (Step S4), and a threshold ITH corresponding to the oil temperature is determined (Step S5). If it is judged that the motor electric current IM is equal to or greater than the threshold ITH (YES in Step S6), it is determined that the working oil has a high viscosity resistance, and the electric motor M is driven at a duty ratio of 100% (Step S7). More specifically, the electric motor M which has been driven at a predetermined duty ratio lower than 100% for idling rotation or assist rotation is driven at the full speed to circulate the working oil through the oil circulation line 24 for speedy increase of the oil temperature. The 100% driving is sustained for a predetermined time period (e.g., 2 seconds) (Step S8). After a lapse of the predetermined time period, the 100% driving is stopped (Step S9). This is because longer-time motor driving may cause seizing up of the electric motor and damage on the driver element.

Figure 6:
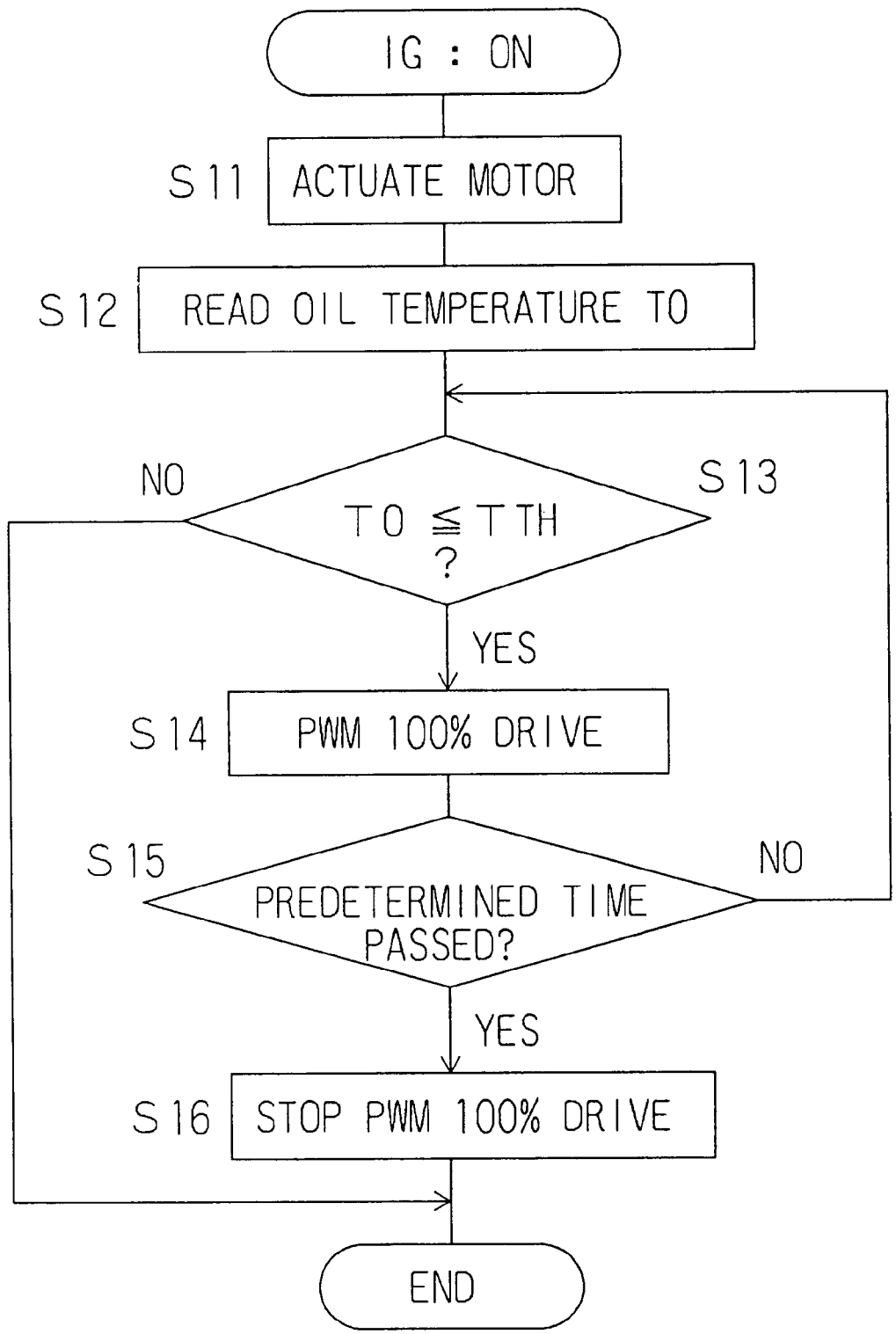
FIG. 6 is a flow chart for explaining another motor driving control process to be performed by the electronic control unit.

Although the electric motor M is driven at a duty ratio of 100% in Step S7 of this process, the duty ratio is not necessarily limited to 100% as long as the electric motor can be rotated at a relatively high speed (this is also applicable to a driving control shown in FIG. 6).

On the other hand, if it is judged in Step S6 that the electric current IM is smaller than the threshold ITH, it is determined that the viscosity resistance of the working oil has become sufficiently low, and the process ends.

FIG. 6 is a flow chart for explaining another motor driving control process to be performed by the electronic control unit ECU at the actuation of the electric motor M. This control process is different from the process shown in FIG. 5 in the following aspect. While the motor control process shown in FIG. 5 is performed on the basis of the motor electric current in view of the fact that the electric current level of the electric motor M increases with an increase in a load on the electric motor, the motor control process shown in FIG. 6 to be performed at the actuation of the electric motor is not based on the motor electric current but on the oil temperature.

Referring to FIG. 6, the electronic control unit ECU actuates the electric motor M (Step S11), and reads the oil temperature signal applied from the oil temperature sensor 28 (Step S12). Then, the electronic control unit compares the oil temperature TO with a threshold TTH (Step S13). If it is judged that the oil temperature TO is equal to or lower than the threshold TTH, the electric motor M is driven at a duty ratio of 100% for reduction of the viscosity resistance of the working oil (Step S14). The 100% driving is sustained for a predetermined time period (e.g., 2 seconds) (Step S15). After a lapse of the predetermined time period, the 100% driving is stopped (Step S16). On the other hand, if it is judged in Step S13 that the oil temperature is higher than the threshold, and the process ends.

In the power steering apparatus according to this embodiment, if the working oil has a relatively high viscosity resistance, the electric motor M is forcibly kept driven until the viscosity resistance becomes sufficiently low. Therefore, the electric motor M can assuredly be actuated even at an extremely low temperature.

Figure 7:
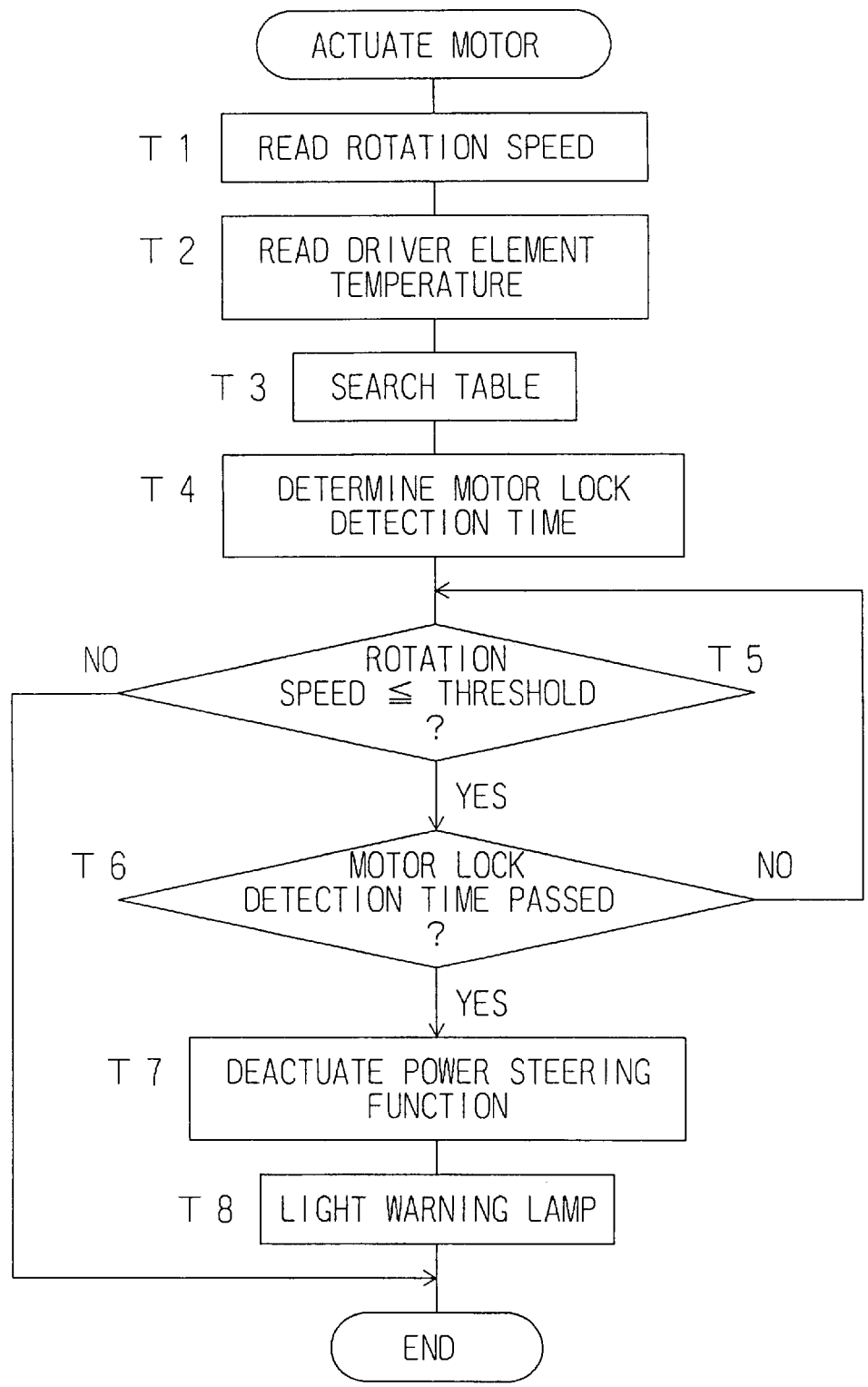
FIG. 7 is a flow chart for explaining a fail-safe function control process to be performed by the electronic control unit ECU at actuation of an electric motor.

FIG. 7 is a flow chart for explaining a fail-safe function control process to be performed by the electronic control unit ECU at the actuation of the electric motor in accordance with another embodiment. This process is performed separately from the electric motor driving control process shown in FIG. 5 or 6.

When the electric motor M is actuated, the electronic control unit ECU first reads the rotation speed of the electric motor M (Step T1). Further, the electronic control unit ECU reads the driver element temperature applied from the driving circuit 29 (Step T2). Then, the table in the ROM (see FIG. 3) is searched (Step T3), and a motor lock detection period corresponding to the driver element temperature is determined (Step T4). It is judged whether or not the rotation speed of the electric motor M is equal to or lower than a threshold (typically several hundreds rpm) (Step T5). If it is determined that the rotation speed of the electric motor M is kept at not higher than the threshold over the motor lock detection period (YES in Step T6), the motor electric current IM is maintained at a high level. At this time, an excess load may be exerted on the electric motor M, so that the seizing up of the electric motor M is predictable. Accordingly, it is judged that a "fail" state has occurred in which the electric motor would be locked. Therefore, the power steering function is suspended (Step S7). The process goes into a manual steering process, and a warning lamp is lit (Step T8). If the rotation speed of the electric motor M is higher than the threshold in Step T5, the process ends.

As described above, the motor lock detection period is stored as the function of the driver element temperature. When the driver element temperature is sensed, the electric current is permitted to flow through the electric motor for a relatively long period if the driver element temperature is low. If the driver element temperature is high, it is judged that the electric current is permitted to flow only for a short period.

Thus, the fail-safe function as well as the protection of the driver element can be realized.

Figure 8:
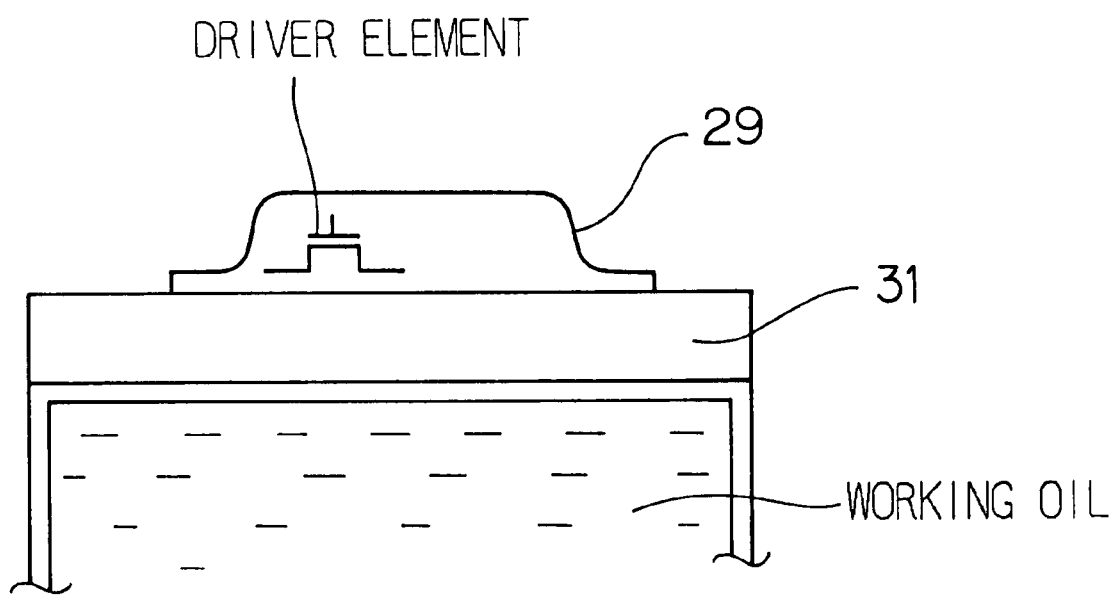
FIG. 8 is a conceptual diagram illustrating an oil-cooling system for a driver element.

While the embodiments of the present invention have thus been described, it should be understood that the invention be not limited to these embodiments. Although the sensor for sensing the oil temperature and the sensor for sensing the driver element temperature are separately provided in the aforesaid embodiments, the oil temperature and the driver element temperature may be determined in the following manner. With such a construction that the driver element is cooled with the working oil via a heat sink 31 as shown in FIG. 8, for example, one of these temperatures can be determined by sensing the other because there is a certain relationship between these temperatures. In this case, a single temperature detection means may be used as the oil temperature detection means and the driver element temperature detection means. Besides, various modifications may be made within the scope of the present invention.

What is claimed is:

1. A power steering apparatus for assisting a steering operation by a hydraulic pressure generated by driving an oil pump by an electric motor, the apparatus comprising:

oil temperature detection means for sensing an oil temperature;

electric current detection means for sensing an electric current flowing through the electric motor;

storage means for storing therein a threshold of the motor electric current as a function of the oil temperature;

judgment means for judging whether or not the motor electric current sensed by the electric current detection means is smaller than the threshold obtained from the storage means on basis of an oil temperature sensed by the oil temperature detection means; and control means for driving the electric motor at a predetermined rotation speed or at a predetermined voltage if the judgment means judges that the motor electric current is not smaller than the threshold obtained from the storage means.

2. A power steering apparatus as set forth in claim 1, wherein, when the electric motor is driven at the predetermined rotation speed or at the predetermined voltage, the driving of the electric motor is sustained for a predetermined time period.

3. A power steering apparatus for assisting a steering operation by a hydraulic pressure generated by driving an oil pump by an electric motor, the apparatus comprising:

driver element temperature detection means for sensing a temperature of an electric motor driver element;

rotation speed detection means for sensing a rotation speed of the electric motor;

judgment means for judging whether or not the rotation speed of the electric motor sensed by the rotation speed detection means is greater than a preliminarily stored threshold; and control means for deactuating a power steering function if the judgment means judges that the rotation speed of the electric motor is kept at not greater than the threshold for a predetermined reference time period, wherein the control means sets the reference time period in accordance with the temperature of the electric motor driver element sensed by the driver element temperature detection means so that the reference time period is reduced as the temperature becomes higher and increased as the temperature becomes lower.

* * * * *